(12) United States Patent
Chuang et al.

(10) Patent No.: US 9,098,915 B2
(45) Date of Patent: Aug. 4, 2015

(54) IMAGE PROCESSING APPARATUS FOR REGIONAL IMAGE ENHANCEMENT AND IMAGE PROCESSING METHOD USING THE SAME

(71) Applicant: NOVATEK MICROELECTRONICS CORP., HsinChu (TW)

(72) Inventors: Yu-Hsing Chuang, Hsinchu (TW); Yu-Pin Chang, Hsinchu County (TW); Chih-Yuan Yang, Hsinchu County (TW); Feng-Ting Pai, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 14/155,894

(22) Filed: Jan. 15, 2014

(65) Prior Publication Data
US 2015/0010248 A1    Jan. 8, 2015

(30) Foreign Application Priority Data
Jul. 4, 2013 (TW) .............................. 102124014 A

(51) Int. Cl.
*G06K 9/40* (2006.01)
*G06T 5/00* (2006.01)

(52) U.S. Cl.
CPC ................ *G06T 5/009* (2013.01); *G06T 5/007* (2013.01)

(58) Field of Classification Search
CPC ........... G06T 5/009; G06T 5/001; G06T 5/20; G06T 5/40; G06T 5/50; H04N 5/20; H04N 1/6027; H04N 1/60; H04N 9/045
See application file for complete search history.

(56) References Cited

U.S. PATENT DOCUMENTS

| | | | | |
|---|---|---|---|---|
| 4,410,908 A | * | 10/1983 | Belmares-Sarabia et al. | 348/661 |
| 6,738,527 B2 | * | 5/2004 | Kuwata et al. | 382/266 |
| 6,813,041 B1 | | 11/2004 | Moroney et al. | |
| 7,302,110 B2 | | 11/2007 | Chesnokov | |
| 7,450,183 B2 | * | 11/2008 | Lee et al. | 348/630 |
| 7,551,797 B2 | * | 6/2009 | Dorrell et al. | 382/274 |
| 8,175,385 B2 | * | 5/2012 | Steinberg et al. | 382/173 |
| 8,416,179 B2 | * | 4/2013 | Kerofsky | 345/102 |
| 8,908,994 B2 | * | 12/2014 | Martin | 382/285 |
| 2014/0301604 A1 | * | 10/2014 | Gupta et al. | 382/103 |
| 2015/0010248 A1 | * | 1/2015 | Chuang et al. | 382/274 |

* cited by examiner

*Primary Examiner* — Amir Alavi
(74) *Attorney, Agent, or Firm* — Rabin & Berdo, P.C.

(57) ABSTRACT

An image processing apparatus for adjusting the luminance of a target pixel of an image is provided. The target pixel includes original pixel data and corresponds to a mask value. The image processing apparatus includes a luminance detection unit, a luminance compensation unit and a mapping unit. The luminance detection unit generates an original luminance value according to the original pixel data. The luminance compensation unit adjusts the original luminance value according to a non-linear function to generate a compensated luminance value. The mapping unit generates adjusted pixel data according to the compensated luminance value. The non-linear function at least includes a first monomial function, which has a base part associated with an inverse value of the original luminance value and an exponent part associated with the mask value.

20 Claims, 3 Drawing Sheets

IMAGE PROCESSING APPARATUS FOR REGIONAL IMAGE ENHANCEMENT AND IMAGE PROCESSING METHOD USING THE SAME

This application claims the benefit of Taiwan application Serial No. 102124014, filed Jul. 4, 2013, the subject matter of which is incorporated herein by reference.

BACKGROUND OF THE INVENTION

1. Field of the Invention

The invention relates in general to an image processing apparatus and an image processing method using the same, and more particularly to an image processing apparatus for regional image enhancement and an image processing method using the same.

2. Description of the Related Art

Current image enhancement technologies are divided into two categories—global image enhancement and regional image enhancement. The former directly adjusts the luminance of an entire image, whereas the latter determines an enhancement level of a region of an image according to the corresponding regional luminance of the image. Compared to global image enhancement, regional image enhancement in general yields better image quality, and the contrast of individual regions of the image processed by regional image enhancement is also higher.

However, regional image enhancement requires a larger computation amount and also has higher hardware costs. Therefore, there is a need for an image processing technology that effectively reduces the computation amount and lowers hardware costs for regional image enhancement.

SUMMARY OF THE INVENTION

The invention is directed to an image processing apparatus for regional image enhancement and an image processing method using the same for effectively reducing the computation amount and lowering hardware costs.

According to an aspect of the present invention, an image processing apparatus for adjusting the luminance of a target pixel of an image is provided. The target pixel includes original pixel data, and corresponds to a mask value. The image processing apparatus includes a luminance detection unit, a luminance compensation unit and a mapping unit. The luminance detection unit generates an original luminance value according to the original pixel data. The luminance compensation unit adjusts the original luminance value according to a non-linear function to generate a compensated luminance value. The mapping unit generates adjusted pixel data according to the compensated luminance value. The non-linear function at least includes a first monomial function, which has a base part associated with an inverse value of the original luminance value and an exponent part associated with the mask value.

According to another aspect of the present invention, an image processing method for adjusting the luminance of a target pixel of an image is provided. The target pixel includes original pixel data, and corresponds to a mask value. The image processing method includes step of: generating an original luminance value according to the original pixel data; adjusting the original luminance value according to a non-linear function to generate a compensated luminance value; and generating adjusted pixel data according to the compensated luminance value. The non-linear function at least includes a first monomial function, which has a base part associated with an inverse value of the original luminance value and an exponent part associated with the mask value.

According to yet another aspect of the present invention, an image processing apparatus for adjusting the luminance of a target pixel of an image is provided. The target pixel includes original pixel data, and corresponds to a mask value. The image processing apparatus includes a luminance detection unit, a luminance compensation unit and a mapping unit. The luminance detection unit generates an original luminance value according to the original pixel data. The luminance compensation unit adjusts the original luminance value according to a non-linear function to generate a compensated luminance value. The mapping unit generates adjusted pixel data according to the compensated luminance value. The non-linear function is realized by a one-dimensional first look-up-table (LUT) corresponding to an exponential function and a one-dimensional second LUT corresponding to a natural logarithm function. The natural logarithm function is associated with an inverse value of the original luminance value, and an exponent part of the exponential function is associated with the mask value.

The above and other aspects of the invention will become better understood with regard to the following detailed description of the preferred but non-limiting embodiments. The following description is made with reference to the accompanying drawings.

DETAILED DESCRIPTION OF THE INVENTION

First Embodiment

Figure 1:
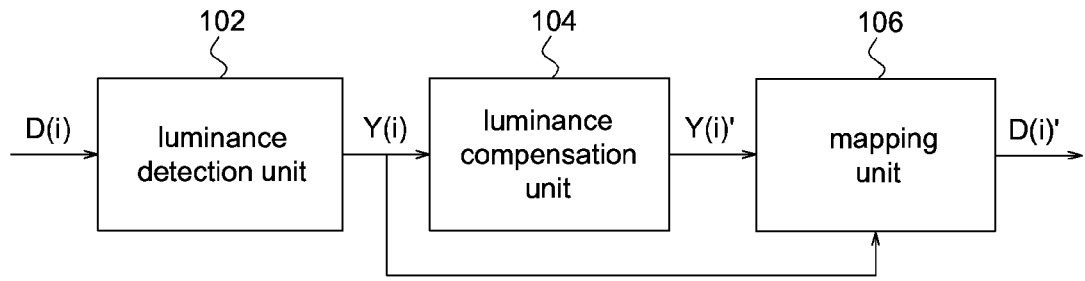
FIG. 1 is a block diagram of an image processing apparatus 100 according to an embodiment of the present invention.
Figure 2:
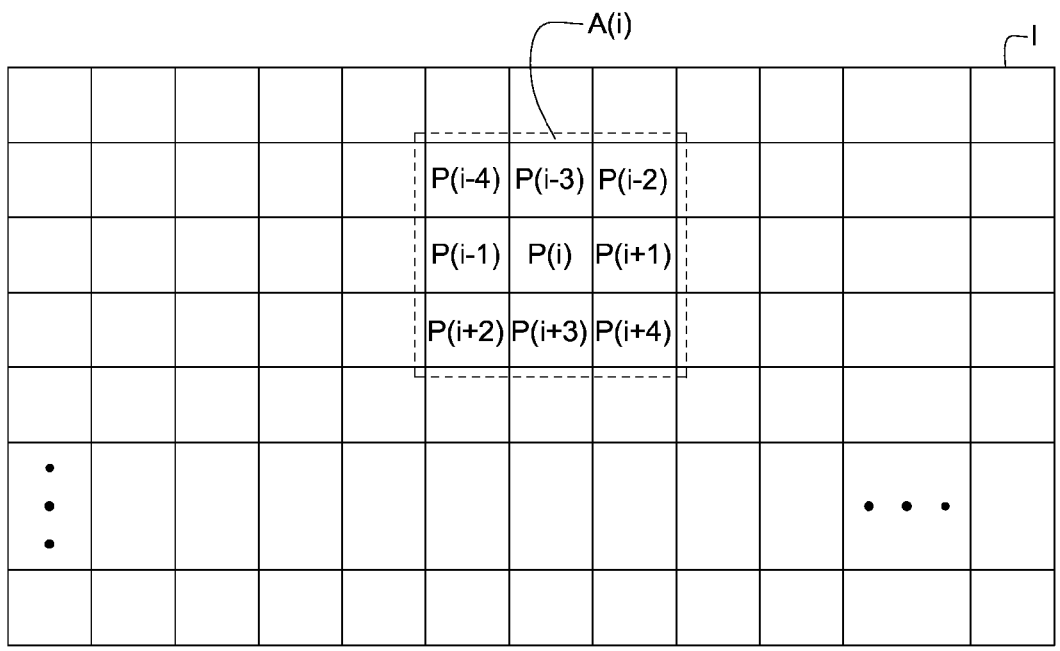
FIG. 2 is a schematic diagram of a pixel area A(i)

FIG. 1 shows a block diagram of an image processing apparatus 100 according to a first embodiment of the present invention. FIG. 2 shows a schematic diagram of an exemplary adjusted image I applied with the image processing apparatus 100. Referring to FIGS. 1 and 2, the image processing apparatus 100 is for adjusting the luminance of a target pixel P(i) of the image I. The target pixel P(i) includes original pixel data D(i), and corresponds to a mask value M(i). The image processing apparatus 100 includes a luminance detection unit 102, a luminance compensation unit 104 and a mapping unit 106. The luminance detection unit 102 generates an original luminance value Y(i) according to the original pixel data D(i). The luminance compensation unit 104 adjusts the original luminance value Y(i) according to a non-linear function Q to generate a compensated luminance value Y(i)'. The mapping unit 106 generates adjusted pixel data D(i)' according to the compensated luminance value Y(i)'. The non-linear function Q at least includes a first monomial function F1, which has a base part associated with an inverse value IY(i) of the original luminance value Y(i) and an exponent part associated with the mask value M(i).

As shown in FIG. 2, for example, the image I includes multiple pixels P(1) to P(N), the target pixel P(i) is one of the pixels P(1) to P(N), and N and i are positive integers. The original pixel data D(i) may be pixel data corresponding to a color space consisted of RGB components or YCbCr components. For example, the mask value M(i) is generated from performing low-pass filtering on a pixel area A(i) corresponding to the target pixel P(i) of the image I. Taking FIG. 2 for example, the image I includes multiple pixels (each represented by one small grid), each of which corresponds to one set of original pixel data. In the embodiment, the pixel area A(i) corresponds to a 3×3 pixel matrix including the target pixel P(i) and neighboring pixels P(i−4) to P(i−1) and P(i+1) to P(i+4). The pixels P(i−4) to P(i−1) and P(i+1) to P(i+4) include original pixel data D(i−4) to D(i−1) and D(i+1) to D(i+4), respectively. For example, the mask value M(i) is generated according to an average value of the pixels P(i−4) to P(i−1) and P(i+1) to P(i+4). In an alternative embodiment, the mask value M(i) may be generated from low-pass filtering based on other methods, and the size of the pixel area A(i) may be altered depending on different applications. Further, the luminance detection unit 102, the luminance compensation unit 104 and the mapping unit 106 may also be implemented through digital circuits or hardware circuits carrying specific function commands. More details of the embodiment are further given below.

Taking the original pixel data D(i) including RGB pixel data for example, the luminance detection unit 102 calculates the original luminance value Y(i) corresponding to luminance information according to red pixel data, green pixel data and blue pixel data of the original pixel data D(i). In other embodiments, methods that generate the corresponding luminance information according to the original pixel data D(i) may also be applied to the luminance detection unit 102 according to the embodiment of the present invention.

Figure 3:
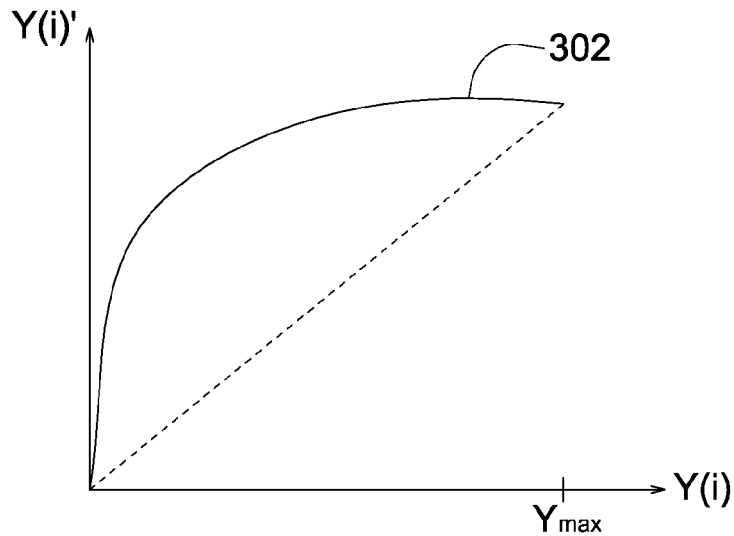
FIG. 3 is a relationship diagram the original luminance value Y(i) and the compensated luminance value Y(i)' according to an embodiment of the present invention.

FIG. 3 shows an exemplary relationship diagram of the original luminance value Y(i) and the compensated luminance value Y(i)' according to an embodiment of the present invention. A curve 302 represents the compensated luminance values Y(i)' corresponding to different original luminance values Y(i) within a luminance range (e.g., 0 to $Y_{max}$). As observed from the curve 302, the luminance compensation unit 104 generates a larger gain for a darker original luminance value Y(i) (i.e., Y(i) in a smaller value). That is, for a smaller original luminance value Y(i), a ratio of the compensated luminance value Y(i)' to the original luminance value Y(i) is larger, so as to generate a greater luminance enhancement effect. In contrast, the luminance compensation unit 104 generates a smaller gain for a brighter original luminance value Y(i) (i.e., Y(i) in a larger value). That is, for a larger original luminance value Y(i), the ratio of the compensated luminance value Y(i)' to the original luminance value Y(i) is smaller, so as to generate a smaller luminance enhancement effect. Thus, the luminance compensation unit 104 may noticeably increase the luminance of a darker part of a specific region of an image, and slightly enhance or even maintain the luminance of a brighter part of the specific region of the image. Such regional image enhancement approach is particularly suitable for situations when a display device is relocated to an environment with a brighter light source, e.g., under the sunlight. By increasing or adjusting the luminance of pixels, an image in a brighter environment is still offered with satisfactory display quality.

For example, the mapping unit 106 obtains a gain G according to the ratio of the compensated luminance value Y(i)' to the original luminance value Y(i), and performs gain mapping according to the gain G to obtain the adjusted pixel data D(i)'. In other embodiments, methods that generate the adjusted pixel data D(i)' according to the compensated luminance value Y(i)' may also be applied to the mapping unit 106 according to the embodiment of the present invention.

In an embodiment, the original luminance value Y(i) is within a luminance range, and the base part of the first monomial function F1 is associated with a result of subtracting the original luminance value Y(i) from the maximum luminance value $Y_{max}$ of the luminance range. The result serves as an inverse value of the original luminance value Y(i). For example, the non-linear function Q further includes a second monomial function F2. The second monomial function F2 is multiplied with the first monomial function F1. The second monomial function F2 has an exponent part associated with a result of subtracting the mask value M(i) from a first constant C1, and a base part associated with a second constant C2.

For example, the non-linear function Q may be:

$$Y(i)'=Y_{max}-C2^{(C1-M(i))}\times(Y_{max}-Y(i))^{M(i)} \quad (1)$$

The size of the mask value M(i) determines the amplitude of luminance enhancement. That is, the amplitude of luminance enhancement gets larger as the mask value M(i) becomes larger. As such, the luminance of the pixel area A(i) that is darker can be effectively increased. Values of the first constant C1 and the second constant C2 are selected in a way that $(Y_{max}-Y(i))^{M(i)}$ is smaller than or equal to the maximum luminance value $Y_{max}$. In an embodiment, the first constant C1 is equal to 1 (given that the mask value M(i) is normalized), and the second constant C2 is equal to the maximum luminance value $Y_{max}$. The above non-linear function Q may be further simplified as:

$$Y(i)'=Y_{max}-e^{[Ln(Y_{max})-M(i)\times(Ln(Y_{max})-Ln(Y_{max}-Y(i)))]} \quad (2)$$

For example, assuming that the maximum luminance value $Y_{max}$ is 255, C2 is also 255, and C1 is equal to 1, equation (1) can be represented as:

$$Y(i)'=255-255^{(1-M(i))}\times(255-Y(i))^{M(i)} \quad (3);$$

and equation (2) can be represented as:

$$Y(i)'=255-e^{[C3-M(i)\times(C3-Ln(255-Y(i)))]} \quad (4);$$

where C3 is a constant.

Figure 4:
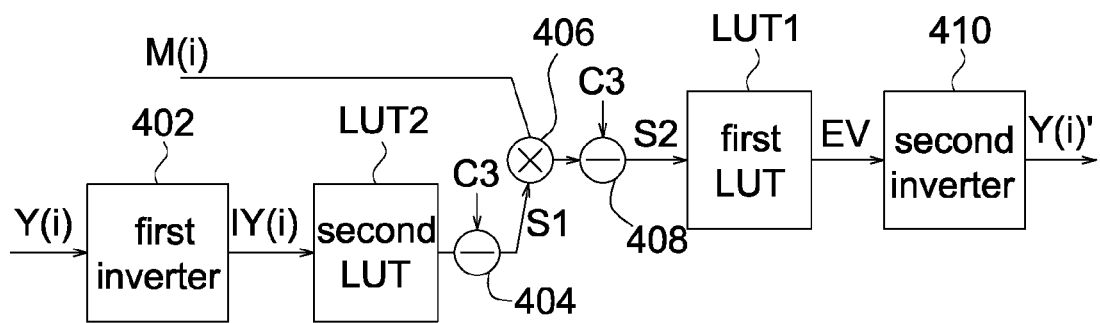
FIG. 4 is a block diagram of a luminance compensation unit 104 according to an embodiment of the present invention.

FIG. 4 shows a block diagram of an example of the luminance compensation unit 104 according to equation (4). The luminance compensation unit 104 includes a first inverter 402, a first subtractor 404, a multiplier 406, a second subtractor 408 and a second inverter 410. The first inverter 402 inverts the original luminance value Y(i) to generate the inverse value IY(i) of the original luminance value Y(i), where IY(i)=255−Y(i). The luminance compensation unit 104 looks up a second look-up table (LUT) LUT2 according to the inverse value IY(i) of the original luminance value Y(i), and obtains a natural logarithm function Ln(255−Y(i)) corresponding to the inverse value IY(i) of the original luminance value Y(i). The above inverting operation refers to inverting the luminance value to change a high luminance value to a low luminance value and a low luminance value to a high luminance value. For example, assuming the original luminance value Y(i) is 90, the inverted original luminance value (i.e., the inverse value IY(i)) is 255−90=165.

The first subtractor 404 subtracts the natural logarithm function value Ln(255−Y(i)) from the constant C3 to generate a first subtracted value S1 (=C3−Ln(255−Y(i))).

The multiplier 406 multiples the first subtracted value S1 with the mask value M(i) to generate a product M(i)×(C3−Ln(255−Y(i))). The second subtractor 408 subtracts the product M(i)×(C3−Ln(255−Y(i))) from the constant C3 to generate a second subtracted value S2 (=C3−M(i)×(C3−Ln(255−Y(i)))).

The luminance compensation unit 104 looks up the first LUT LUT1 according to the second subtracted value S2 to obtain an exponential function value EV (=$e^{[C3-M(i)\times(C3-Ln(255-Y(i)))]}$) corresponding to the second subtracted value S2. The exponential function value EV is a result of substituting the second subtracted value S2 into an exponential function having a natural number (e) as a base part. The second inverter 410 inverts the exponential function value EV to generate the compensated luminance value Y(i)' (=255−$e^{[C3-M(i)\times(C3-Ln(255-Y(i)))]}$).

The first LUT LUT1 is required to store only exponential function results corresponding to different second subtracted values S2, and the second LUT LUT2 is required to store only results of natural logarithms obtained from different inverse values IY(i). Therefore, the first LUT LUT1 and the second LUT LUT2 may be realized by one-dimensional LUTs. In the embodiment, as the non-linear function Q may be realized by the one-dimensional first LUT LUT1 corresponding to the exponential function and the one-dimensional second LUT LUT2 corresponding to the natural logarithm function, hardware spaces can be effectively reduced. Taking 8-bit pixel data for example, the first and second LUTs LUT1 and LUT2 only need storage spaces of equal to 1×256 storage units. To simplify computations, the first and second LUTs LUT1 and LUT2 may even be designed to be storage spaces smaller than 1×256 storage units. Therefore, compared to two-dimensional LUTs involved in the prior art or even image enhancement methods involving division calculations, the image processing apparatus according to the embodiment not only significantly reduces the area of LUTs but also effectively lowers the computation amount for increasing the processing speed.

Second Embodiment

A main difference of the second embodiment from the first embodiment is that, the base part of a first monomial function F1' of the non-linear function Q is associated with a result of subtracting the original luminance value Y(i) from an adjusted upper limit $Y_A$. When the original luminance value Y(i) is larger than the adjusted upper limit $Y_A$, the compensated luminance value Y(i)' generated by the luminance compensation unit 104 is substantially equal to the original luminance value Y(i). The non-linear function Q further includes a second function F2'. The second function F2' is a positive real number k, and is multiplied with the first monomial function F1'. For example, the non-linear function Q may be:

$$Y(i)'=Y_A-k\times(Y_A-Y(i))^{M(i)} \quad (5)$$

The size of the mask value M(i) determines the amplitude of luminance enhancement. That is, the amplitude of luminance enhancement gets larger as the mask value M(i) becomes larger. The value of the positive real number k is selected in a way that $(N-Y_{in})^a$ is smaller than or equal to the adjusted upper limit $Y_A$. The above non-linear function Q may be further simplified as:

$$Y(i)'=Y_A-k\times e^{[M(i)\times Ln(Y_A-Y(i))]} \quad \text{equation (6)}$$

Figure 5:
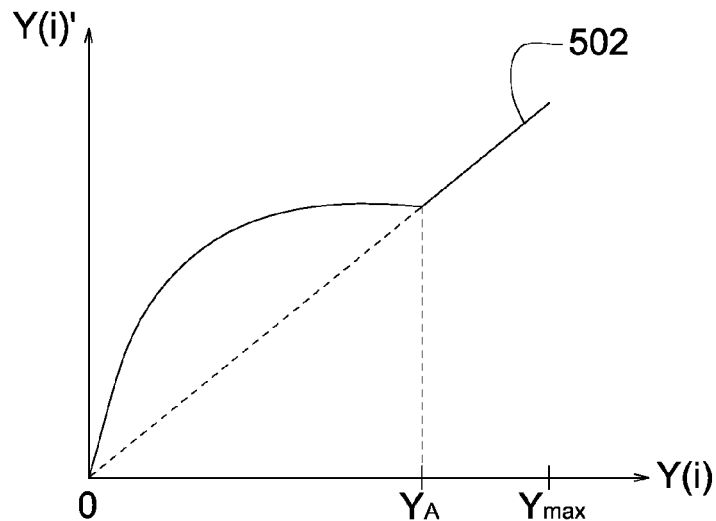
FIG. 5 is a relationship diagram of the original luminance value Y(i) and the compensated luminance value Y(i)' according to another embodiment of the present invention.

FIG. 5 shows a relationship diagram of the original luminance value Y(i) and the compensated luminance value Y(i)'. A curve 502 represents the compensated luminance values Y(i)' corresponding to different original luminance values Y(i) within a luminance range (e.g., 0 to $Y_{max}$). As observed from the curve 502, when the original luminance value Y(i) is smaller than or equal to the adjusted upper limit $Y_A$, luminance enhancement similar to the curve 302 is performed. When the original luminance value Y(i) is greater than the adjusted upper limit $Y_A$, the compensated luminance value Y(i)' is substantially equal to the original luminance value Y(i). Thus, the luminance compensation unit 104 of the embodiment is capable of enhancing the luminance of the original luminance value of a specific luminance range (e.g., 0 to $Y_A$) to thereby increase design flexibilities.

Figure 6:
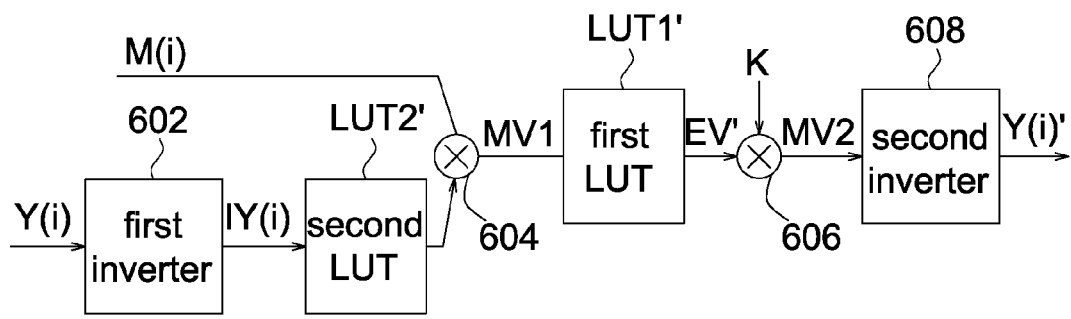
FIG. 6 is a block diagram of a luminance compensation unit 104 according to another embodiment of the present invention.

FIG. 6 shows a block diagram of an example of the luminance compensation unit 104 according to the equation (6). The luminance compensation unit 104 includes a first inverter 602, a first multiplier 604, a second multiplier 606 and a second inverter 608. The first inverter 602 inverts the original luminance value Y(i) to generate the inverse value IY(i) of the original luminance value Y(i), where IY(i)=$Y_A$−Y(i). The luminance compensation unit 104 looks up a second LUT LUT2' according to the inverse value IY(i) of the original luminance value Y(i) to obtain a natural logarithm function value Ln($Y_A$−Y(i)) corresponding to the inverse value IY(i) of the original luminance value Y(i).

The first multiplier 604 multiplies the natural logarithm function value Ln($Y_A$−Y(i)) with the mask value M(i) to generate a first product MV1 (=M(i)×n($Y_A$−Y(i))). The luminance compensation unit 104 looks up a first LUT LUT1' according to the first product MV1 to obtain an exponential function value EV' (=$e^{[M(i)\times Ln(Y_A-Y(i))]}$) corresponding to the first product MV1.

The second multiplier 606 multiplies the exponential function value EV' with a positive real number k represented by the second function F2' to generate a second product MV2 (=k×$e^{[M(i)\times Ln(Y_A-Y(i))]}$). The second inverter 608 inverts the second product MV2 to generate the compensated luminance value Y(i)' (=$Y_A$−k×$e^{[M(i)\times Ln(Y_A-Y(i))]}$).

In the embodiment, as the non-linear function Q may be realized by the one-dimensional first LUT1' corresponding to the exponential function and the one-dimensional second LUT2' corresponding to the natural logarithm function, hardware spaces can be effectively reduced. Therefore, compared to conventional image enhancement methods, the image processing apparatus according to the embodiment not only significantly reduces the area of LUTs but also effectively lowers the computation amount for increasing the processing speed.

An image processing method for adjusting the luminance of a target pixel of an image is further provided by the present invention. The target pixel includes original image data, and corresponds to a mask value. The image processing method includes the steps of: generating an original luminance value according to the original pixel data; adjusting the original luminance value according to a non-linear function to generate a compensated luminance value; generating adjusted pixel data according to the compensated luminance value. The non-linear function at least includes a first monomial function, which has a base part associated with an inverse value of the original luminance value and an exponent part associated with the mask value.

In conclusion, according to the embodiments of the present invention, the image processing apparatus and the image processing method using the same adjust an original luminance value by utilizing a non-linear function. The non-linear function at least includes a first monomial function, which has a base part and an exponent part associated with an inverse value of the original luminance value and a mask value, respectively. Thus, the non-linear function may be realized by a one-dimensional first LUT corresponding to an exponential function and a one-dimensional second LUT corresponding to a natural logarithm function, thereby significantly reducing the area of the LUTs as well as the computation amount.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing apparatus, for adjusting a luminance of a target pixel of an image, the target pixel comprising original pixel data and corresponding to a mask value, the image processing apparatus comprising:
    a luminance detection unit, for generating an original luminance value according to the original pixel data;
    a luminance compensation unit, for adjusting the original luminance value according to a non-linear function to generate a compensated luminance value; and
    a mapping unit, for generating adjusted pixel data according to the compensated luminance value;
    wherein the non-linear function at least comprises a first monomial function, which has a base part associated with an inverse value of the original luminance value and an exponent part associated with the mask value, and the luminance detection unit, the luminance compensation unit and the mapping unit are implemented by hardware.

2. The image processing apparatus according to claim 1, wherein the non-linear function is realized by a one-dimensional first look-up table (LUT) corresponding to an exponential function and a one-dimensional second LUT corresponding to a natural logarithm function.

3. The image processing apparatus according to claim 1, wherein the non-linear function further comprises a second monomial function; the second monomial function is multiplied with the first monomial function, and has an exponent part associated with a result of subtracting the mask value from a first constant and a base part associated with a second constant.

4. The image processing apparatus according to claim 3, wherein the luminance compensation unit comprises:
    a first inverter, for inverting the original luminance value to generate an inverse value of the original luminance value, wherein the luminance compensation unit looks up the second LUT according to the inverse value of the original luminance value to obtain a natural logarithm function value corresponding to the inverse value of the original luminance value;
    a first subtractor, for subtracting the natural logarithm function value from a first logarithm value to generate a first subtracted value;
    a multiplier, for multiplying the first subtracted value with the mask value to generate a product;
    a second subtractor, for subtracting the product from a second logarithm value to generate a second subtracted value, wherein the luminance compensation unit looks up the first LUT according to the second subtracted value to obtain an exponential function value corresponding to the second subtracted value; and
    a second inverter, for inverting the exponential function value to generate the compensated luminance value.

5. The image processing apparatus according to claim 3, wherein the original luminance value is within a luminance range, and the base part of the first monomial function is associated with a result of subtracting the original luminance value from a maximum luminance value of the luminance range.

6. The image processing apparatus according to claim 5, wherein the non-linear function is:

$$Y_{out}=Y_{max}-C2^{(c1-a)}\times(Y_{max}-Y_{in})^a,$$

where $Y_{out}$ represents the compensated luminance value, $Y_{max}$ represents the maximum luminance value, C1 represents the first constant, C2 represents the second constant, a represents the mask value, and $Y_{in}$ represents the original luminance value.

7. The image processing apparatus according to claim 1, wherein the non-linear function further comprises a second function, and the second function is a positive real number and is multiplied with the first monomial function.

8. The image processing apparatus according to claim 7, wherein the luminance compensation unit comprises:
    a first inverter, for inverting the original luminance value to generate an inverse value of the original luminance value, wherein the luminance compensation unit looks up the second LUT according to the inverse value of the original luminance value to obtain a natural logarithm function value corresponding to the inverse value of the original luminance value;
    a first multiplier, for multiplying natural logarithm function value with the mask value to generate a first product, wherein the luminance compensation unit looks up the first LUT according to the first product to obtain an exponential function value corresponding to the first product;
    a second multiplier, for multiplying the exponential function value with the second function to generate a second product; and
    a second inverter, for inverting the second product to generate the compensated luminance value.

9. The image processing apparatus according to claim 7, wherein the base part of the first monomial function is associated with a result of subtracting the original luminance value from an adjusted upper limit, and the compensated luminance value generated by the luminance compensation unit is substantially equal to the original luminance value when the original luminance value is greater than the adjusted upper limit.

10. The image processing apparatus according to claim 9, wherein the non-linear function is:

$$Y_{out}=Y_A-k\times(Y_A-Y_{in})^a,$$

where $Y_{out}$ represents the compensated luminance value, $Y_A$ represents the adjusted upper limit, a represents the mask value, and $Y_{in}$ represents the original luminance value.

11. The image processing apparatus according to claim 1, wherein the target pixel data corresponds to a pixel area, the pixel area comprises a plurality of sets of pixel data, and the mask value is generated by performing low-pass filtering on the pixel area.

12. An image processing method, for adjusting a luminance of a target pixel of an image, the target pixel comprising original pixel data and corresponding to a mask value, the image processing method comprising:
    generating an original luminance value according to the original pixel data;
    adjusting the original luminance value according to a non-linear function to generate a compensated luminance value; and generating adjusted pixel data according to the compensated luminance value;

wherein, the non-linear function at least comprises a first monomial function, which has a base part associated with an inverse value of the original luminance value and an exponent part associated with the mask value.

13. The image processing method according to claim 12, wherein the non-linear function is realized by a one-dimensional first LUT corresponding to an exponential function and a one-dimensional second LUT corresponding to a natural logarithm function.

14. The image processing method according to claim 13, wherein the original luminance value is within a luminance range, and the base part of the first monomial function is associated with a result of subtracting the original luminance value from a maximum luminance value of the luminance range.

15. The image processing method according to claim 12, wherein the non-linear function further comprises a second monomial function; the second monomial function is multiplied with the first monomial function, and has an exponent part associated with a result of subtracting the mask value from a first constant and a base part associated with a second constant.

16. The image processing method according to claim 12, wherein the non-linear function further comprises a second function, and the second function is a positive real number and is multiplied with the first monomial function.

17. The image processing method according to claim 16, wherein the base part of the first monomial function is associated with a result of subtracting the original luminance value from an adjusted upper limit, and the compensated luminance value is substantially equal to the original luminance value when the original luminance value is greater than the adjusted upper limit.

18. An image processing apparatus, for adjusting a luminance of a target pixel of an image, the target pixel comprising original pixel data and corresponding to a mask value, the image processing apparatus comprising:

a luminance detection unit, for generating an original luminance value according to the original pixel data;

a luminance compensation unit, for adjusting the original luminance value according to a non-linear function to generate a compensated luminance value; and a mapping unit, for generating adjusted pixel data according to the compensated luminance value;

wherein the non-linear function is realized by a one-dimensional first LUT corresponding to an exponential function and a one-dimensional second LUT corresponding to a natural logarithm function, the natural logarithm function value is associated with an inverse value of the original luminance value, and an exponent part of the exponential function is associated with the mask value, and the luminance detection unit, the luminance compensation unit and the mapping unit are implemented by hardware.

19. The image processing apparatus according to claim 18, wherein the original luminance value is within a luminance range, and the non-linear function is:

$$Y_{out}=Y_{max}-e^{[Ln(Y_{max})-a\times(Ln(Y_{max})-Ln(Y_{max}-Y_{in}))]},$$

where $Y_{out}$ represents the compensated luminance value, $Y_{max}$ represents the maximum luminance value, a represents the mask value, and $Y_{in}$ represents the original luminance value.

20. The image processing apparatus according to claim 18, wherein the non-linear function is:

$$Y_{out}=Y_A-k\times e^{[a\times Ln(Y_A-Y_{in})]},$$

where limit represents the compensated luminance value, $Y_A$ represents the adjusted upper limit, k represents a positive real number, a represents the mask value, and $Y_{in}$ represents the original luminance value.

* * * * *